United States Patent
French

[11] B 3,913,654
[45] Oct. 21, 1975

[54] PNEUMATIC TIRES

[75] Inventor: Tom French, Sutton Coldfield, England

[73] Assignee: Dunlop Holdings Limited, London, England

[22] Filed: June 7, 1971

[21] Appl. No.: 150,560

[44] Published under the Trial Voluntary Protest Program on January 28, 1975 as document no. B 150,560.

[30] Foreign Application Priority Data
June 20, 1970 United Kingdom............... 30032/70

[52] U.S. Cl........ 152/330 L; 152/330 RF; 152/354; 152/353 R
[51] Int. Cl.²......................................... B60C 17/00
[58] Field of Search ........... 152/330, 352, 354, 355, 152/362, 158, 353, 353 A

[56] References Cited
UNITED STATES PATENTS

| | | | |
|---|---|---|---|
| 3,115,921 | 12/1963 | Leibee | 152/352 |
| 3,143,155 | 8/1964 | Knox | 152/330 |
| 3,299,934 | 1/1967 | Pace | 152/354 |
| 3,392,772 | 7/1968 | Powers | 152/352 |
| 3,610,308 | 10/1971 | McDonald | 152/353 A |

*Primary Examiner*—Drayton E. Hoffman
*Attorney, Agent, or Firm*—Stevens, Davis, Miller & Mosher

[57] ABSTRACT

A pneumatic tire having recesses in its internal surface in those regions which come into contact when the tire is run deflated under load. A lubricating material can be held in the recesses to lubricate the surfaces when they come into contact, of which the following is a specification.

10 Claims, 7 Drawing Figures

PNEUMATIC TIRES

This invention relates to pneumatic tires.

Upon partial or complete deflation of a pneumatic tire mounted on a wheel during the running of a vehicle opposite surfaces in the interior of the tire and wheel assembly come into contact with one another under more or less load according to whether or not the deflation is complete; the regions of the interior surfaces of the tire which come into contact are those regions of the interior surfaces of the tire close to but radially outwardly of the rim flange and the interior surfaces of the tire close to but radially inwardly of the tread edge.

When the surfaces come into contact considerable heat is generated within the rubber and textile components of the tire and very rapid structural failure ensues. It has been discovered that the major source of the heat generated is caused by the relative movement of the surfaces in contact and under load and the temperature rise is particularly marked because of the high coefficient of friction of dry rubber to dry rubber.

According to the present invention there is provided a pneumatic tire having on or adjacent to an internal surface thereof which comes into contact with a further internal surface of the tire when the tire is used in a deflated condition, recessed portions in which a liquid or solid lubricating material can be held so that opposed internal surfaces when brought into contact by partial or complete deflation of the tire can be lubricated during rotation of the tire under load.

The recessed portions may comprise spaces formed between smoothly rounded humps moulded onto the said internal surface or surfaces or they may comprise spaces formed between a network of ribs which ribs can be inclined in different directions one to another preferably with a plurality of the spaces interconnecting. Alternatively, the recessed portions each may comprise one of a plurality of pores formed within the internal surfaces of the tire, the pores communicating with the said surface to supply lubricating material from the pores to the surface in particular when two surfaces are brought into contact under substantial pressure.

In a further alternative the recessed portions may comprise a network of grooves formed in the internal surface of the tire.

In all of the instances referred to the recessed portions may be formed in one of the said opposed internal surfaces so that one only of two opposed surfaces brought into contact are provided with recessed portions; however, both opposed surfaces may be so provided.

Particular internal surfaces of the tire which may be provided with recessed portions are, for example, the interior surfaces of the tire close to but radially outwardly of the rim flange contacting region of the tire and the interior surfaces of the tire close to but radially inwardly of the tread edge.

In all of the instances referred to the lubricating material can be retained, even under extreme pressure loadings between opposed internal tire surfaces of a loaded, deflated tire, within the recesses and, during the relative rubbing action between the loaded surfaces, the lubricant is smeared onto the surfaces between the recesses to maintain a continuous surface which is fully lubricated.

The effect of the lubricant is to ensure that the coefficient of friction of opposed rubbing surfaces is very low and that little heat is generated. The vehicle on which the tire and wheel were mounted is thus enabled safely to travel substantial distances e.g. 10 or more miles at a reasonable speed e.g. 30 m.p.h.

The invention is preferably utilized in conjunction with flowable liquid lubricants as described in the assignee's co-pending application Ser. No. 154,326 filed June 18, 1971, for example, water based solutions of Teepol (Registered Trade Mark) or mixtures of water with glycerine with or without a defoaming agent and gelling agent or dispersions of graphite.

This invention is applicable in particular to tires having breaker assemblies and having carcasses of radial cords but can be applied to carcasses of cross-bias cords. Since the tire is designed to be run under-deflated or substantially under-inflated conditions it perferably has a relatively low aspect ratio e.g. between 30 per cent and 75 per cent, more preferably between 55 per cent and 70 per cent and preferably the width of the tire tread is greater than the width between flanges, of the wheel rim for which the tire is designed.

The invention may be utilized in conjunction with the inventions described in the assignees' co-pending application Ser. Nos. 150,627; 150,562; 150,561 and 150,564; all filed June 7, 1971.

The invention applies to tire and wheel assemblies in which the tire can be removed from the rim or, alternatively, when the tire is not removable therefrom i.e. the two form a permanent assembly, for example, when the rim is swaged over the tire beads after assembly of the tire and rim.

The invention will now be described in more detail, by way of example only, with reference to the accompanying drawings in which.

Figure 1:
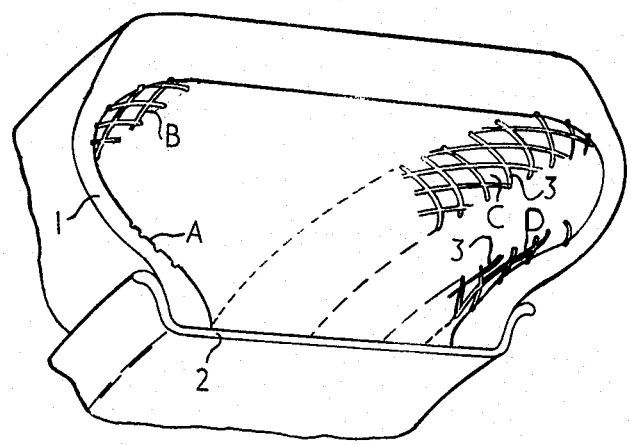
FIG. 1 is a schematic sectional perspective view of a tire and wheel assembly.

As shown in FIG. 1 a tire mounted on a wheel rim 2 is provided with a criss-cross pattern of grooves 3 in those interior surfaces of the tyre A, B, C and D which will come into contact if the tire is deflated and placed under load.

FIGS. 2 to 6 show various surfaces which can be used for the surfaces A, B, C and D.

Figure 2:
FIGS. 2 to 6 are sectional views showing various surface profiles.

FIG. 2 illustrates in profile an alternative surface consisting of a plurality of closely-spaced parallel grooves 4 separated by smooth humps 5. The grooves 4 are orientated circumferentially or radially in the tire on the surfaces A, B, C and D.

Figure 3:

In the alternative surface profile shown in FIG. 3 are provided a series of channels 6 each containing a rib 7. The channels are arranged circumferentially in the tire.

Figure 4:
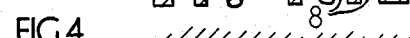

In the alternative surface profile shown in FIG. 4 a series of small holes 8 are provided in the interior surface of the tire.

Figure 5:

The alternative shown in FIG. 5 is similar to that of FIG. 2 except that the smooth humps 9 are more closely spaced than those in FIG. 2 and the grooves 10 between the humps are correspondingly narrow.

Figure 6:
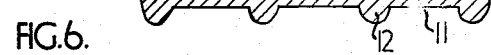

The alternative profile shown in FIG. 6 provides a number of smoothly rounded ridges 12 on a recessed flat surface. The ridges are orientated circumferentially with respect to the tire.

Figure 7:
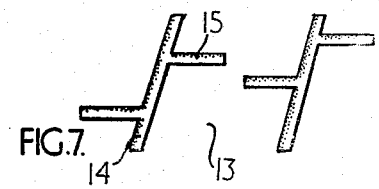
FIG. 7 is a plan view showing a possible groove arrangement for a tire in accordance with the invention.

FIG. 7 shows in plan view a groove arrangement alternative to that shown in FIG. 1 on the surface A, B, C and D. A series of laterally disposed grooves 14 are provided in the interior surface 13 of the tire side grooves 15 branching from the grooves 14 are also provided the side grooves 15 extending circumferentially with respect to the tire. The positions of the side grooves 15 on adjacent lateral grooves 14 are staggered with respect to one another.

Having now described my invention what I claim is:

1. A pneumatic tire and wheel assembly capable of being run in a deflated condition comprising:
   a. a wheel rim having a pair of annular flanges;
   b. a pneumatic tire mounted on the wheel to define an inflation chamber and having a tread portion with a width greater than the width of the wheel rim measured between the flanges;
   c. means to prevent the tire from becoming dislodged from the wheel rim when running deflated;
   d. the entire interior surface of the tire and the inflation chamber being free of intermediate supporting structure so that when the assembly is run deflated, opposed internal surfaces of the tire come into contact;
   e. a plurality of lubricant retaining portions recessed into said internal surface in at least one localized region thereof in which a lubricant material can be held so that opposed internal surfaces when brought into contact can be lubricated during rotation of the tire under load.

2. A pneumatic tire according to claim 1 in which recessed portions are provided in the interior surfaces of the tire close to but radially inwardly of the tread edge.

3. A pneumatic tire and wheel assembly according to claim 1 having an aspect ratio of between 30 and 75 percent.

4. A pneumatic tire and wheel assembly according to claim 3 having an aspect ratio of between 55 and 70 percent.

5. A pneumatic tire and wheel assembly according to claim 1 in which the recessed portions are formed in both of the said opposed internal surfaces so that both of two opposed surfaces brought into contact are provided with recessed portions.

6. A pneumatic tire and wheel assembly according to claim 1 in which recessed portions are provided in the interior surfaces of the tire close to but radially outwardly of the rim flange contacting region of the tire.

7. A pneumatic tire and wheel assembly according to claim 1 in which the recessed portions comprise spaces formed between smoothly rounded humps moulded onto the said internal surface.

8. A pneumatic tire and wheel assembly according to claim 1 in which the recessed portions comprise spaces formed between a network of ribs.

9. A pneumatic tire and wheel assembly according to claim 1 in which the recessed portions each comprise one of a plurality of pores formed within the internal surface of the tire, the pores communicating with the said surface to supply lubricating material from the pores to the surface, in particular when two surfaces are brought into contact under substantial pressure.

10. A pneumatic tire and wheel assembly according to claim 1 in which the recessed portions comprise a network of grooves formed in the internal surface of the tire.

* * * * *